(12) United States Patent
Colgan

(10) Patent No.: US 12,038,278 B2
(45) Date of Patent: Jul. 16, 2024

(54) SYSTEMS FOR MEASURING AND DISPLAYING WAKE HEIGHT

(71) Applicant: William Colgan, Grandview, OH (US)

(72) Inventor: William Colgan, Grandview, OH (US)

( * ) Notice: Subject to any disclaimer, the term of this patent is extended or adjusted under 35 U.S.C. 154(b) by 334 days.

(21) Appl. No.: 17/682,814

(22) Filed: Feb. 28, 2022

(65) Prior Publication Data

US 2022/0276047 A1 Sep. 1, 2022

Related U.S. Application Data

(60) Provisional application No. 63/154,965, filed on Mar. 1, 2021.

(51) Int. Cl.
*G01C 13/00* (2006.01)
*G08C 17/02* (2006.01)

(52) U.S. Cl.
CPC ........... *G01C 13/004* (2013.01); *G08C 17/02* (2013.01)

(58) Field of Classification Search
CPC .............................. G01C 13/004; G08C 17/02
See application file for complete search history.

(56) References Cited

U.S. PATENT DOCUMENTS 3,769,838 A 11/1973 Buckler
8,195,395 B2 * 6/2012 Teng ...................... B63B 22/00
702/50

FOREIGN PATENT DOCUMENTS

JP 4921048 B2 4/2012

* cited by examiner

*Primary Examiner* — Jamel E Williams
(74) *Attorney, Agent, or Firm* — Standley Law Group LLP; Beverly A. Marsh; Kenny W. Pung

(57) ABSTRACT

The invention is a system for measuring boat wake and generating a meaningful representation of boat wake for watercraft operators. The invention includes a sensor mounted in a fixed location above the surface of an adjacent body of water. The apparatus further includes a programmable logic controller to evaluate the measurements collected by the sensor. The measurements are compared to each other to determine the maximum and minimum wake heights across a set time interval. The difference between the max and min distance is converted to inches and this is the wake height value which is broadcast via antenna to a display station. The display station receives the broadcast and displays the wake height value in a location and size visible to the operator of the boat.

20 Claims, 4 Drawing Sheets

SYSTEMS FOR MEASURING AND DISPLAYING WAKE HEIGHT

CROSS-REFERENCE TO RELATED APPLICATION

This application is a nonprovisional patent application that makes a priority claim to U.S. Provisional Application No. 63/154,965.

FIELD

The application relates to systems for measuring and displaying boat wake height and, more particularly, to systems that utilize distance sensors to measure wake height and a display unit for displaying this information to watercraft operators.

BACKGROUND

No technology exists for the measurement and display of wave height. Existing wave measurement technology is focused on floating sense stations measuring waves in the open ocean. See JP4921048B2, U.S. Pat. No. 3,769,838 and US8195395B2 which are incorporated herein by reference. Such technology is typically used for the purpose of weather observation and forecasting. Management of wake in navigable waterways consists entirely of regulatory solutions, including the posting of signage to indicate "no wake" zones. No technology exists to measure the wake produced by a watercraft and to supply that information to the operator Wave damage to harbors and navigable waterways remains a constant threat. The threat is twofold. The wave action both damages anchored watercraft and greatly accelerates the erosion process on seawalls, dredged harbors, and natural embankments. In 2017, the Boat Owners Association of The United States Marine Insurance Program ranked wake-related damage to boats as its $10^{th}$-most common claim, immediately following theft. Fort, C. (2018, August/September) Top 10 Marine Insurance Claims. *BoatUS*, 92-100. Many millions of dollars are spent every year on maintaining navigable waterways. Expenditures for dredging federally maintained harbors in the 2018 fiscal year totaled nearly $1.2 billion. EveryCRSReport. (2019, June 14) Harbor Dredging: Issues and Historical Funding. Retrieved from https://www.everycrsreport.com/reports/IN11133.html. Boat wake is a significant contributor, and sometimes the most significant contributor in sheltered waterways, to wave erosion. In a 2017 report by the Scientific and Technical Advisory Committee (STAC) of the Chesapeake Bay Program boat-generated waves were identified to be especially damaging because they represent "a significant source of erosive wave force due to their longer wave period and greater wave height" as compared to wind waves. The report suggests that it is the height itself of the waves that is especially damaging. Similarly, a Texas A&M University Department of Geography study reported that while vessel-generated waves represented only 5% of the cumulative wave energy over the study, they accounted for almost 25% of the cumulative wave force due to their larger height and longer period. The waves undercut shoreline, discourage vegetation growth, and negatively impact fauna by increasing turbidity.

The National Marine Manufacturers Association (NMMA) estimated that in 2002 there were 12,000 marinas, boatyards, yacht clubs, dockominiums, parks, and related facilities. A typical expense for erosion control in a private marina is $20,000 annually. There are thousands of instances where wake control is desired, but limited options for controlling it.

With the goal of limiting the destructive wake generated by watercraft, there are limited options available. The traditional approach has been to post "No Wake" signage in sensitive areas. Officially, the definition of "No Wake" is the minimum speed at which a vessel is controllable. This definition gives rise to a number of problems, most notably that many vessels can travel well above their minimum controllable speed without producing any wake. Operators are left to make a purely subjective, and therefore highly variable, judgment of the appropriate speed. Commonly, an operator travels at a speed that produces what he considers to be an acceptable wake. This wake may be significantly more than the harbormaster considers appropriate, but without any objective method of measurement, it's impossible that wake control will be effective. Some sort of feedback to the operator is necessary. A speed limit is not effective, because some boats, like sailboats for example, can travel at a significant speed without producing any wake. Paradoxically, even some very small craft, like personal watercraft, produce a very significant wake at even a very low speed. It is an aspect of the invention disclosed herein to measure the wake produced by watercraft of all types. In another aspect of the invention, the disclosed device and methods measure wake height and report the measurement to the watercraft operator. This enables the operator to adjust his speed appropriately, and further permits a harbormaster to set a specific wake-height limit in a controlled waterway.

SUMMARY OF INVENTION

In a preferred exemplary embodiment, the invention disclosed herein comprises a sensing station exposed to watercraft-generated wake. A sensor disposed within the sensing station is in electronic communication with a processor such that the sensor measures the height of the wake and subsequently reports the measurement(s) to the processor. In the preferred exemplary embodiment, the processor collects a plurality of measurements, performs a comparison of said data points, and determines a maximum and minimum wave height over a predetermined interval of time and then generates a wake height value utilizing those values. The processor is preferably in communication with a display such that the calculated wave height value is transmitted from the sensing station to the display. The display is preferably positioned in a manner calculated to be visible to the operator of the watercraft. The wave height value on the display is preferably of a size that can be read by the watercraft operator. In preferred embodiments the display must be located well in front of the watercraft, while the sensing station must be able to take measurements of the wake well behind the watercraft. Measurements may be transmitted from the sensing station to the display via wired or wireless connection in some exemplary embodiments.

Disclosed are systems for measuring and displaying wake height. These systems include a sensing station and a display station.

In one embodiment, the system includes a sensing station that is positionable near a body of water. The sensing station includes a sensor configured to measure the distance between the sensing station and the surface of a body of water. The sensing station further includes a control unit operatively connected to the sensor that is configured to receive measurement data from the sensor and calculate a wake height value. The sensing station further includes a transmitter operatively connected to the control unit that is configured to transmit the wake height value. The display station includes a receiver configured to receive the wake height value from the transmitter. The display station further includes an electronic display operatively connected to the receiver that is configured to display the wake height value.

In another embodiment, the system includes a sensing station that is positionable near a body of water. The sensing station includes an ultrasonic distance measurement sensor configured to measure the distance between the sensing station and the surface of a body of water. The sensing station further includes a control unit operatively connected to the sensor that is configured to receive measurement data from the sensor and calculate a wake height value. The sensing station further includes a transmitter operatively connected to the control unit that is configured to transmit the wake height value. The display station includes a receiver configured to receive the wake height value from the transmitter. The display station further includes an electronic display operatively connected to the receiver that is configured to display the wake height value.

In yet another embodiment, the system is for measuring wake height in a water channel that includes an entrance and extends a distance therefrom. The system includes a sensing station that is positionable that includes a sensor configured to measure the distance between the sensing station and the surface of a body of water. The sensing station further includes a control unit operatively connected to the sensor that is configured to receive measurement data from the sensor and calculate a wake height value. The sensing station further includes a transmitter operatively connected to the control unit that is configured to transmit the wake height value. The display station includes a receiver configured to receive the wake height value from the transmitter. The display station further includes an electronic display operatively connected to the receiver that is configured to display the wake height value. In this embodiment, the sensing station is positioned near the entrance of the channel and the display station is positioned further down the channel.

Other examples of the disclosed system for measuring and displaying wake height will become apparent from the following detailed description, the accompanying drawings, and the appended claims.

DETAILED DESCRIPTION OF EXEMPLARY EMBODIMENTS

Some exemplary embodiments of the present invention are directed towards the use of the device described herein. Any embodiment of the present invention may include any of the optional or preferred features of the other embodiments of the present invention. The exemplary embodiments herein disclosed are not intended to be exhaustive or to unnecessarily limit the scope of the invention. The exemplary embodiments were chosen and described in order to explain some of the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Figure 1:
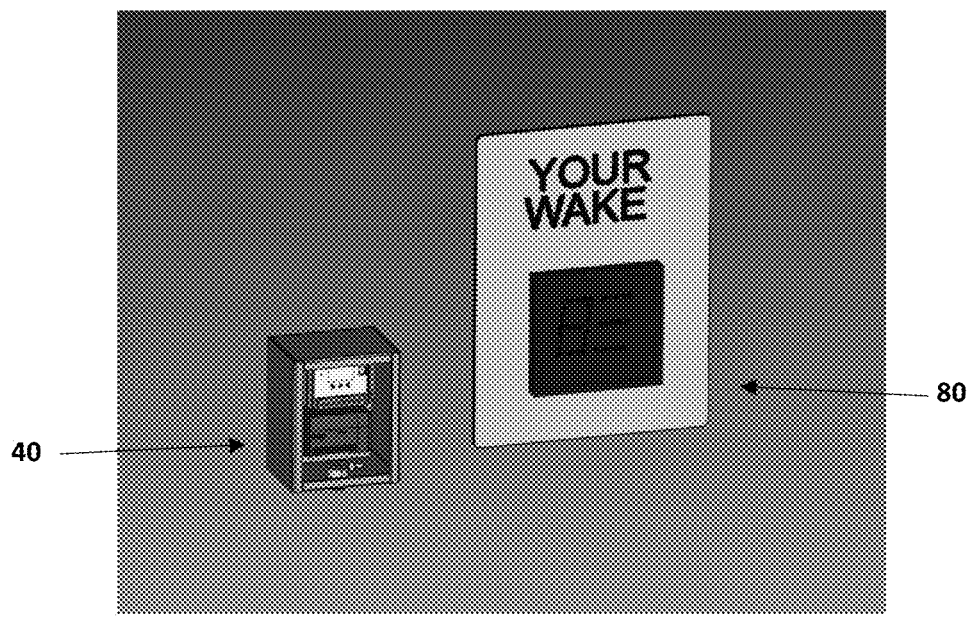
FIG. 1 is a perspective view of an exemplary sensing station and an exemplary display station.
Figure 2:
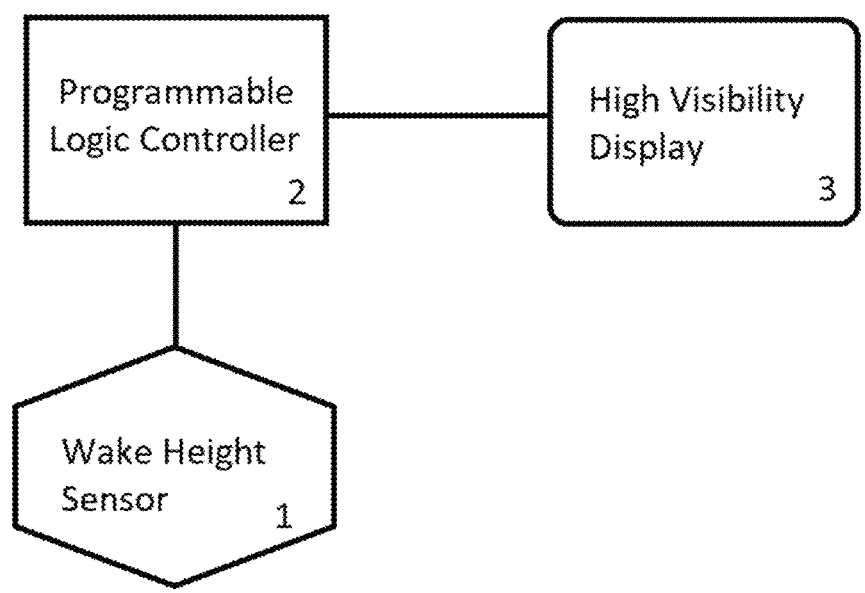
FIG. 2 is a block diagram illustrating the relationship of the major components in a preferred exemplary embodiment of the system.

FIG. 1 shows a perspective view of an exemplary sensing station 40 and exemplary display station 80 of a preferred exemplary embodiment. In using the preferred exemplary embodiment shown in FIG. 1, the sensing station 40 is preferably positioned so that it is stationary with respect to wake produced upon an adjacent body of water. The body of water may be a marina, harbor, etc. wherein at least one watercraft is anticipated to travel through the water and produce the wake. In a preferred exemplary embodiment, the sensing station 40 is securely affixed to a surface or structure adjacent to the body of water (e.g., a pier, a post, etc.), so that the sensing station 40 is maintained a fixed height above the surface of the water. Because the position of the surface of the water may change throughout the day (e.g., with changes in tide) in some embodiments, the sensing station 40 may be securely connected to a flotation device which floats upon the top of the body of water and which maintains the sensing station 40 at a fixed height above the water throughout the day. For example, it is contemplated that the sensing station 40 may be attached to a vertical post on the edge of a floating dock, which thereby holds the sensing station out over the water and provides it with a view of the water surface. In a preferred exemplary embodiment, the sensing station 40 is positioned so as to be able to measure the height of wake produced at the backside of one or more watercraft traveling through the adjacent water body.

In a preferred exemplary embodiment, the sensing station 40 comprises an ultrasonic distance measurement sensor able to detect the surface of the water. The field of view of the sensor is preferably such that it is suitable to measure distance to the water across the range of possible water heights. Further, the field of view of the sensor would ideally be narrow enough to distinguish the crest of a wave from the trough. It is contemplated that a sensor capable of establishing a field of view of 10 inches or less in diameter, or more preferably about 8 inches in diameter, over the water surface may be suitable. Additionally, it is contemplated that the sensor may possess a refresh rate quick enough to detect crests and troughs in rapid succession (e.g., intervals of 1 second or less, or more preferably intervals of 0.2 seconds).

The sensor must be capable of conveying measured distances to a control unit via a sensor output, e.g., a 4-20 mA analog output. In the preferred exemplary embodiments, the control unit features an interface to collect measurements—e.g., a 4-20 mA analog input—for evaluation and calculation of wave height.

Figure 3:
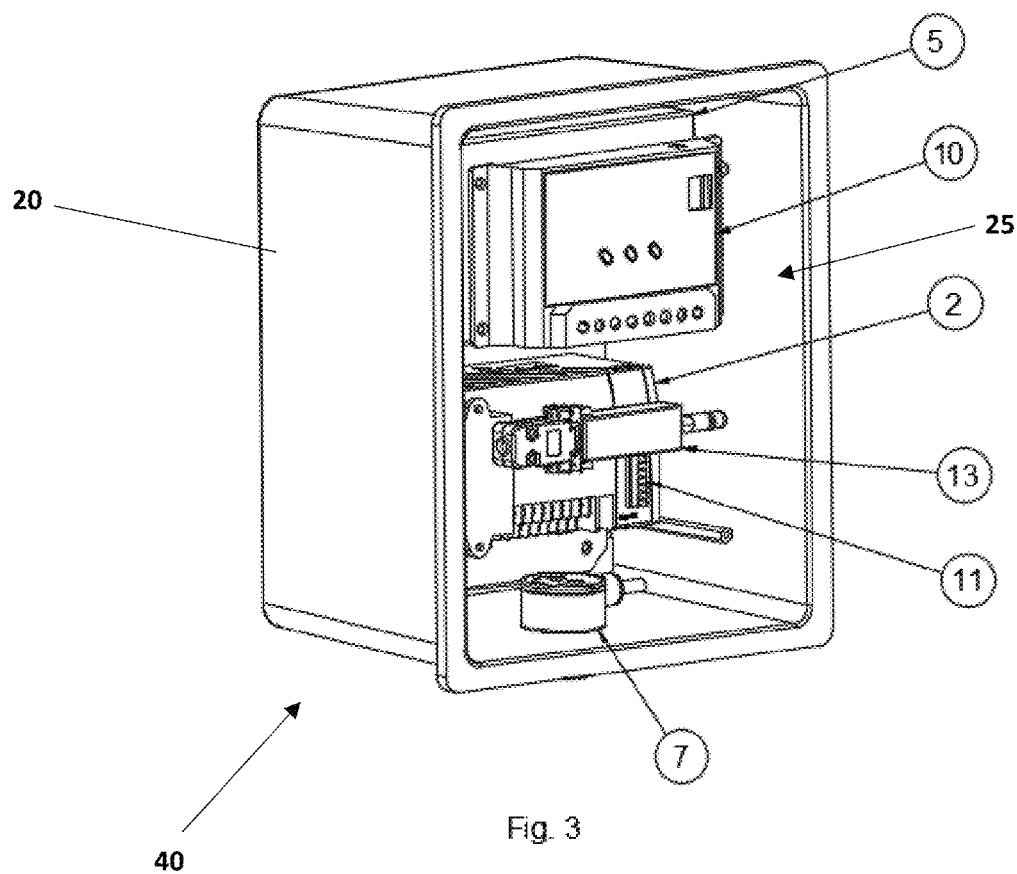
FIG. 3 is a detail drawing of an exemplary sensing station comprising a programmable logic controller, a battery, an ultrasonic sensor, a solar charge controller, an analog input module, and a serial to Bluetooth transmitter.

In the exemplary embodiment of FIG. 1, the sensing station 40 comprises at least one sensor that is capable of measuring the height of wake produced on the water body by a watercraft (i.e., a boat) traveling through the water. A preferred exemplary embodiment of a sensing station 40 is shown in FIG. 3. The exemplary sensing station shown in FIG. 3 includes a housing 20 that houses a control unit 25 and a sensor 7 that is operatively connected to the control unit 25. The control unit 25 can include any suitable configuration of logic circuitry such as a processor (including microprocessors) or a programmable logic controller that incorporates a processor. Also shown in FIG. 1 is battery 5 and solar charge controller 10, which may be included in preferred embodiments. Control unit 25 can further be enabled by operatively connecting functional modules such as analog input module 11 and serial-to-Bluetooth transmitter 13. Those skilled in the art will appreciate that while this embodiment is exemplary, it is not meant to be limiting. Other embodiments of the sensing station may include control units 25 featuring different configurations of electronic circuitry (e.g., processors, RAM, memory storage, power supply, functional modules, etc.) without departing from the scope of the present disclosure.

The sensor 7 of the sensing station 40 may be an ultrasonic distance measuring sensor, such as the T30UXIB model ultrasonic sensor available from Banner Engineering Corp. of Plymouth, Minn. The sensor is in communication with the control unit 25 in preferred embodiments. When the sensor 7 obtains wake height measurements, the measurement values are subsequently sent to the control unit 25. The control unit 25 preferably collects the measurement values from the at least one sensor over a predetermined time interval and makes a comparison of the measurement values and generates a wake height value. In preferred exemplary embodiments, the predetermined time interval for which wake height data is collected is between 5 and 15 seconds, such as 7 second intervals or 10 second intervals. Different time intervals may be set in different exemplary embodiments. In preferred exemplary embodiments, the control unit 25 collects the wake height measurements from over the predetermined time interval, makes a comparison of the measurements, and determines the maximum and minimum wake height measurements over the time interval. In a preferred exemplary embodiment, the control unit 25 calculates a wake height value by subtracting the minimum wake height from the maximum wake height. The calculated wake height value may be defined by any suitable unit of measurement (e.g., inches, feet, millimeters, centimeters, etc.). The calculated wake height value may also be rounded up or down to the nearest integer value.

Figure 4:
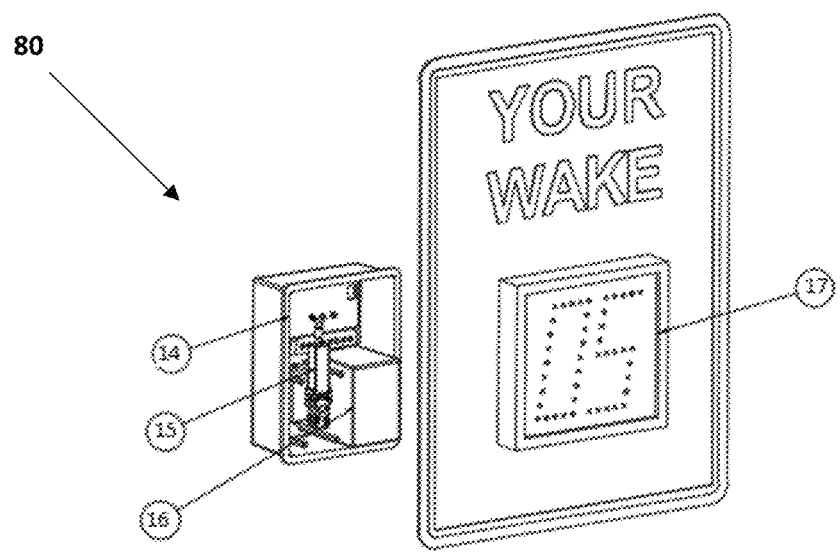
FIG. 4 is a detail drawing of an exemplary display station comprising a solar charge controller, a battery, a Bluetooth to serial receiver, and a numeric display.

In preferred exemplary embodiments, the sensing station 40 communicates with a display station 80. This communication may be established via a transmitter connected or otherwise incorporated into the control unit 25 of the sensing station 40. In preferred exemplary embodiments, upon calculation of a new wave height value, the calculated value is output from the control unit 25 over a RS-232 serial connection via a serial-to-Bluetooth module 13, and communicated via the transmitter to a Bluetooth receiver. The receiver in this exemplary embodiment communicates the serial value over wired connection to the display station 80. An exemplary display station 80 is shown in FIG. 4. As shown in FIG. 4, the exemplary display station 80 comprises a solar charge controller 14, battery 16, Bluetooth-to-serial receiver 15, and a numeric display 17. In preferred exemplary embodiments, the display station 80 receives the wave height value and displays wave height on a numeric display 17 of a type and size visible to the watercraft operator, e.g. a 7-segment LED numeric display of 5" numbers. The numeric display 17 may, but need not, be limited to any number of digits and may vary depending on the unit of measurement utilized for defining the wake height value. For example, a two-digit numeric display may be suitable for presenting wake height values calculated in inches; whereas a three-digit numeric display may be suitable for presenting wake height values calculated in millimeters. Variations such as these will not result in a departure from the scope of the present disclosure. Accompanying signage may also be included to indicate that the displayed value represents the height of generated wake.

In some exemplary embodiments, such as that shown in FIG. 4, the display station 80 comprises a receiver adapted to receive signals from the transmitter. The display station 80 comprises an electronic display. The display station 80 is preferably positioned adjacent to the body of water such that the display will likely be in front of and highly visible to operators of the watercraft whose wake is being/has been measured by the sensing station. In a preferred embodiment, the display station 80 is positioned on a post wherein at least the part of the post holding the display station 80 is maintained outside of the body of water. The display station 80 is preferably adapted to receive signals from the sensing station 40 and generate a display of the wake height value. These displays are preferably whole numbers that correlate to the height of the wake (e.g., in inches, millimeters, etc.). As discussed, the actual wake height value may be round to the nearest integer after calculating the difference between the maximum and minimum wake height.

A preferred exemplary embodiment comprises a method for measuring wake height. In such an embodiment, an ideal application would be the entrance to a channel where wake needs to be maintained below 4 inches in height, but boat traffic routinely produces wake 8 inches in height. The invention affords the harbormaster the ability to post "Wake Limit" signage which posts a specific acceptable height of wake in the "No Wake" zone. The invention would preferably be deployed by installing the sensing station 40 in the "No Wake" zone at the entrance to the channel. The display station 40 will preferably be located at a point farther along the channel where it will be in view of water craft operators when their wake reaches the sensing station 40. Shortly after a boat passes the sensing station, the boat's wake will reach the sensing station 40, and the wake will be measured by the at least one sensor of the sensing station 40. Subsequently, the data is sent to and received by the control unit 25 of the sensing station 40. The control unit 25 preferably calculates a maximum and minimum wake height over a predetermined time period and uses those values to calculate a wake height value. The wake height value is preferably the difference between the maximum and minimum values. The wake height value measurement may subsequently be broadcast to the display station 80, where it will be displayed in full view of the watercraft operator. Armed with knowledge that his wake exceeds posted limits, the watercraft operator can adjust the speed of the watercraft to bring his wake into compliance. Preferred exemplary embodiments may continue to post wake height values over multiple time periods so that operators of watercraft can determine how changes in the speed of their watercraft are affecting the height of their wake. In preferred embodiments, the signage may also be utilized in combination with the display station. The signage may post the "No Wake" zone and can further include a specific wake height limit (correlating to a wake height value) for operators to obey. Additional systems could be added to control boat traffic traveling in the opposite direction.

In preferred exemplary embodiments, the sensing station 40 and the display station 80 comprise at least one solar panel adapted to generate energy from sunlight. A sensing station 40 and display station 80 may comprise a battery for power. In preferred exemplary embodiments the sensing station 40 and display station 80 will each comprise a solar panel and a battery adapted to provide power. In some exemplary embodiments, the generated energy of a solar panel utilized by exemplary embodiments is preferably such that the sensing station 40 and display station 80 can be powered fully from solar energy.

In preferred exemplary embodiments, the sensing station 40 may comprise a first sensor and a second sensor. The first sensor may be positioned within or on top of the body of water and adapted to sense movements of the water. This sensor may generate a signal which causes the second sensor, which is preferably located at a fixed position in relationship to the top of the water, to begin taking wake height measurements for a period(s) of time. As an example, the first and second sensors in these embodiments may be ultrasonic distance measuring sensors. Such exemplary embodiments may prevent the wake height sensor from having to take wake height measurements continuously even when there is no movement of the water. In other exemplary embodiments, the sensing station 40 takes measurement of wake height continuously (i.e. 24 hours a day). In some exemplary embodiments, a sensing station 40 may comprise a photo sensor which detects nightfall and causing the sensor to stop taking measurements of wake height after dark.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

What is claimed:

1. A system for measuring and displaying wake height, the system comprising:
   a sensing station positionable near a body of water, the sensing station comprising:
     a sensor configured to measure the distance between the sensing station and the surface of a body of water;
     a control unit operatively connected to the sensor that is configured to receive measurement data from the sensor and calculate a wake height value;
     a transmitter operatively connected to the control unit that is configured to transmit the wake height value;
   a display station comprising:
     a receiver configured to receive the wake height value from the transmitter;
     an electronic display operatively connected to the receiver that is configured to display the wake height value.

2. The system of claim 1, wherein the sensing station further comprises a waterproof housing that houses the sensor and the control unit.

3. The system of claim 1, wherein the sensor projects a field of view that is 8 inches or less in diameter over the surface of the water.

4. The system of claim 1, wherein the control unit comprises an analog input module and the sensor is configured to transmit measurement data to the control unit via an analog signal.

5. The system of claim 4, wherein the analog input module is configured for 4-20 milliamp analog signals.

6. The system of claim 1, wherein the transmitter is a serial-to-Bluetooth module and the receiver is a Bluetooth receiver.

7. The system of claim 6, wherein the control unit transmits the wake height value to the transmitter via a RS232 serial connection.

8. The system of claim 1, wherein at least one of the sensing station and the display station further comprises a solar panel configured to power the associated station.

9. The system of claim 1, wherein the display is a numeric display.

10. The system of claim 9, wherein the numeric display comprises 5-inch numbers.

11. The system of claim 1, wherein:
    the sensor is configured to deactivate upon the occurrence of a predetermined condition;
    the system further comprises a second sensor operatively connected to the control unit that is configured to detect the occurrence of the predetermined condition; and
    the control unit is configured to reactive the sensor when the second sensor detects the occurrence of the predetermined condition.

12. The system of claim 11, wherein the predetermined condition is nightfall and the second sensor is a photo sensor.

13. The system of claim 11, wherein the predetermined condition is movement in the body of water and the second sensor is an ultrasonic distance measuring sensor.

14. A system for measuring and displaying wake height, the system comprising:
    a sensing station positionable near a body of water, the sensing station comprising:
      an ultrasonic distance measurement sensor configured to measure the distance between the sensing station and the surface of a body of water;
      a control unit operatively connected to the sensor that is configured to receive measurement data from the sensor and calculate a wake height value;
      a transmitter operatively connected to the control unit that is configured to transmit the wake height value;
    a display station comprising:
      a receiver configured to receive the wake height value from the transmitter;
      an electronic display operatively connected to the receiver that is configured to display the wake height value.

15. The system of claim 1, wherein the sensor is configured to repeatedly take measurements at time intervals of 1 second or less.

16. The system of claim 1, wherein:
    the control unit is configured to determine a maximum and a minimum distance value from the measurement data received from the sensor over an interval of time; and
    the control unit is configured to calculate the wake height value by subtracting the minimum distance value from the maximum distance value.

17. The system of claim 16, wherein the interval of time is between 5 and 15 seconds.

18. The system of claim 16, wherein the control unit is configured to round the wake value height to the nearest integer value.

19. The system of claim 16, wherein the control unit is configured to calculate the wake height value in at least one of inches and millimeters.

20. A system for measuring and displaying wake height in a water channel, the water channel comprising an entrance and extends a distance therefrom, the system comprising:
- a sensing station comprising:
  - a sensor configured to measure the distance between the sensing station and the surface of a body of water;
  - a control unit operatively connected to the sensor that is configured to receive measurement data from the sensor and calculate a wake height value;
  - a transmitter operatively connected to the control unit that is configured to transmit the wake height value;
- a display station comprising:
  - a receiver configured to receive the wake height value from the transmitter;
  - an electronic display operatively connected to the receiver that is configured to display the wake height value;
  - wherein the sensing station is positioned near the entrance of the channel and the display station is positioned further down the channel.

* * * * *